(12) United States Patent
Mochizuki

(10) Patent No.: US 12,196,970 B2
(45) Date of Patent: Jan. 14, 2025

(54) IMAGE GENERATION DEVICE AND HEAD-UP DISPLAY

(71) Applicant: KOITO MANUFACTURING CO., LTD., Tokyo (JP)

(72) Inventor: Kohei Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 65 days.

(21) Appl. No.: 17/919,832

(22) PCT Filed: Apr. 23, 2021

(86) PCT No.: PCT/JP2021/016418
§ 371 (c)(1),
(2) Date: Oct. 19, 2022

(87) PCT Pub. No.: WO2021/220955
PCT Pub. Date: Nov. 4, 2021

(65) Prior Publication Data
US 2023/0152586 A1    May 18, 2023

(30) Foreign Application Priority Data
Apr. 27, 2020 (JP) .................. 2020-078251

(51) Int. Cl.
*G02B 27/01* (2006.01)
*B60K 35/60* (2024.01)
(Continued)

(52) U.S. Cl.
CPC .......... *G02B 27/0172* (2013.01); *B60K 35/60* (2024.01); *G02B 27/0101* (2013.01);
(Continued)

(58) Field of Classification Search
CPC ................ G02B 27/01; G02B 27/0101; G02B 27/0172; G02B 2027/0118; B60K 35/00;
(Continued)

(56) References Cited

U.S. PATENT DOCUMENTS 6,480,219 B1 * 11/2002 Uejima ................... B41J 2/451
347/256
2019/0004314 A1 * 1/2019 Hayashi ............. G02B 19/0066

FOREIGN PATENT DOCUMENTS

JP    2001-091877 A     4/2001
JP    2001228812 A  *  8/2001  ........... G02B 6/0021
(Continued)

OTHER PUBLICATIONS

International Search Report issued on Jul. 13, 2021 for WO 2021/220955 A1 (5 pages).

*Primary Examiner* — William C Vaughn, Jr.
*Assistant Examiner* — Astewaye Gettu Zewede
(74) *Attorney, Agent, or Firm* — Venjuris, P.C.

(57) ABSTRACT

An image generation device for generating an image for a head-up display includes: a first light source; a second light source disposed to be spaced apart from the first light source by a certain distance; a lens that transmits light emitted from the first light source and the second light source; and a display device that forms light that generates the image from the light transmitted through the lens. The lens is constituted by a first region that transmits first light from the first light source, and a second region that transmits second light from the second light source, and a light shield is further provided to prevent the first light from transmitting through the second region and prevent the second light from transmitting through the first region.

8 Claims, 13 Drawing Sheets

(51) Int. Cl.
*B60K 35/23* (2024.01)
*B60K 35/40* (2024.01)

(52) U.S. Cl.
CPC ............ *B60K 35/23* (2024.01); *B60K 35/415* (2024.01); *B60K 2360/23* (2024.01)

(58) Field of Classification Search
CPC ...... B60K 35/23; B60K 35/60; B60K 35/415; B60K 2360/23; B60R 11/02; H04N 5/64
See application file for complete search history.

(56) References Cited

FOREIGN PATENT DOCUMENTS

| JP | 2011-051311 A | | 3/2011 |
|----|---------------|---|--------|
| JP | 2018-004673 A | | 1/2018 |
| JP | 2018083593 A | * | 5/2018 |
| KR | 10-2019-0075665 A | | 7/2019 |
| WO | 2017/131185 A1 | | 8/2017 |

* cited by examiner

IMAGE GENERATION DEVICE AND HEAD-UP DISPLAY

CROSS REFERENCE TO RELATED APPLICATIONS

This application is a national phase of PCT application No. PCT/JP2021/016418, filed on 23 Apr. 2021, which claims priority from Japanese patent application No. 2020-078251, filed on 27 Apr. 2020, all of which are incorporated herein by reference.

TECHNICAL FIELD

The present disclosure relates to an image generation device and a head-up display including the image generation device.

BACKGROUND

In the future society of automatic driving, a visual communication between a vehicle and a human being is expected to become increasingly important. For example, a visual communication between a vehicle and a crew in the vehicle is expected to become increasingly important. In this regard, a head-up display (HUD) may be used to implement the visual communication between the vehicle and the crew. The head-up display may implement a so-called augmented reality (AR) by projecting an image or a video on a windshield or a combiner, and superimposing the image on the actual space through the windshield or the combiner to make the image visible to the crew of the vehicle.

Patent Document 1 discloses an illumination device used for transmissive illumination of a liquid crystal display device as a head-up display. The illumination device includes a plurality of light sources and a polarization conversion element. The polarization conversion element includes a light transmission member that transmits light, a polarization separation film that transmits p-polarized light and reflects s-polarized light of the light incident on the light transmission member, and a reflective portion that reflects the p-polarized light transmitted through the polarization separation film.

PRIOR ART DOCUMENT

Patent Document

Patent Document 1: Japanese Patent Laid-Open Publication No. 2018-004673

SUMMARY OF THE INVENTION

Problem to be Solved

In the meantime, there is room for improvement in preventing the occurrence of glare in the illumination device disclosed in Patent Document 1.

Therefore, the present disclosure is to provide an image generation device capable of preventing the occurrence of glare, and a head-up display including the image generation device.

Means to Solve the Problem

In order to achieve the goal discussed above, an image generation device according to one aspect of the present disclosure is an image generation device for generating an image for a head-up display. The image generation device includes: a first light source; a second light source disposed to be spaced apart from the first light source by a predetermined distance; a lens that transmits light emitted from the first light source and the second light source; and a display device that forms light that generates the image from the light transmitted through the lens. The lens is constituted by a first region that transmits first light from the first light source, and a second region that transmits second light from the second light source, and a light shielding portion is further provided to prevent the first light from transmitting through the second region and prevents the second light from transmitting through the first region.

According to the image generation device having the above configuration including the light shielding portion, it is possible to prevent the glare that can occur due to the light that is emitted from the first light source and transmits the second region, or the light that is emitted from the second light source and transmits the first region.

Further, the image generation device according to the present disclosure further includes a holder that holds the lens, and the light shielding portion may be provided in the holder in a state of being disposed between the first light source and the second light source in a space formed between the first and second light sources and the lens.

According to the above configuration, since the light shielding portion is provided in the holder, it is possible to reduce the number of parts as compared with a case where the light shielding portion is provided separately from the holder. As a result, the image generation device may be manufactured at a low cost.

Further, in the image generation device according to the present disclosure, the light shielding portion may be a protrusion that protrudes toward the first light source and the second light source from a third region formed between the first region and the second region on the incident surface of the lens.

According to the above configuration, since the light shielding portion is provided to protrude from the lens, it is possible to reduce the number of parts as compared with a case where the light shielding portion is provided separately from the lens. As a result, the image generation device may be manufactured at a low cost.

Further, in the image generation device according to the present disclosure, the light shielding portion may be an emboss-processed surface applied between the first region and the second region on the incident surface of the lens. Alternatively, the light shielding portion may further include an emboss-processed surface applied between the first region and the second region on the incident surface of the lens, separately from the light shielding portion provided in the holder.

According to the above configuration, it is possible to reliably prevent the glare by a simple processing.

Further, in the image generation device according to the present disclosure, the light shielding portion may include a first reflective surface and a second reflective surface in which the first reflective surface may be disposed at a position where light directed from the first light source toward the second region side is reflected toward the first region in the space formed between the first and second light sources and the lens. The second reflective surface may be disposed at a position where light directed from the second light source toward the first region side is reflected toward the second region in the space.

According to the above configuration, it is possible to prevent the occurrence of glare without deteriorating the effective utilization rate of the light emitted from the first light source and the second light source.

Further, in the image generation device according to the present disclosure, each of the first region and the second region may be an aspherical lens having an incident surface and an emitting surface both formed as a convex surface.

According to the above configuration, the light emitted from the first light source and the second light source may be aberration-corrected by the lens and incident on the display device as parallel light. As a result, the generation precision of the virtual image may be improved.

Further, the head-up display according to the present disclosure includes at least one image generation device described above, and at least one reflecting portion that reflects light emitted from the image generation device such that the light is irradiated to a windshield or a combiner.

According to the above configuration, a head-up display including the image generation device capable of preventing the occurrence of glare may be provided.

Effect of the Invention

According to the present disclosure, the image generation device capable of preventing the occurrence of glare, and the head-up display including the image generation device may be provided.

DETAILED DESCRIPTION TO EXECUTE THE INVENTION

Figure 1:
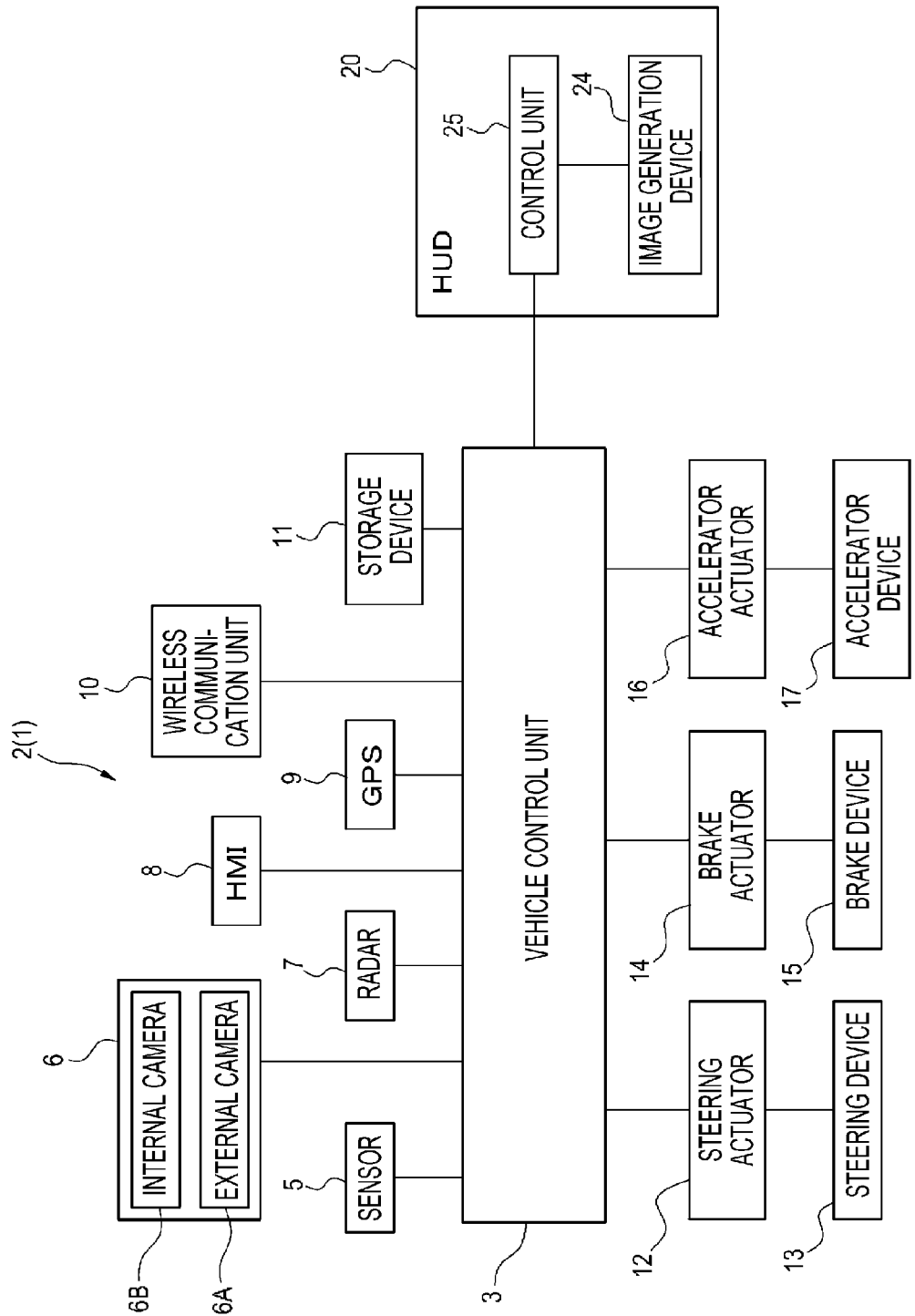
FIG. 1 is a block diagram of a vehicle system including a head-up display (HUD) according to an embodiment.

Hereinafter, embodiments of the present disclosure (hereinafter, referred to as "the embodiment") will be described with reference to the drawings. Dimensions of members illustrated in the drawings may be different from actual dimensions of the members for convenience of explanation.

Further, in the descriptions of the embodiment, the "left-right direction," the "upward-downward direction," and the "front-rear direction" may be appropriately stated for convenience of description. Those directions are relative directions set for a head-up display (HUD) 20 illustrated in FIG. 2. Here, the "left-right direction" is a direction including the "left direction" and the "right direction." The "upward-downward direction" is a direction including the "upper direction" and the "downward direction." The "front-rear direction" is a direction including the "front direction" and the "rear direction." Although not illustrated in FIG. 2, the left-right direction is a direction perpendicular to the upward-downward direction and the front-rear direction.

A vehicle system 2 including the HUD 20 according to the embodiment will be described below with reference to FIG. 1. FIG. 1 is a block diagram of the vehicle system 2. The vehicle 1 on which the vehicle system 2 is mounted is a vehicle (automobile) capable of traveling in an automatic driving mode.

As illustrated in FIG. 1, the vehicle system 2 includes a vehicle control unit 3, a sensor 5, a camera 6, a radar 7, a human machine interface (HMI) 8, a global positioning system (GPS) 9, a wireless communication unit 10, and a storage device 11. Further, the vehicle system 2 includes a steering actuator 12, a steering device 13, a brake actuator 14, a brake device 15, an accelerator actuator 16, and an accelerator device 17. Further, the vehicle system 2 includes the HUD 20.

The vehicle control unit 3 is configured to control traveling of the vehicle 1. The vehicle control unit 3 is constituted by, for example, at least one electronic control unit (ECU). The electronic control unit includes a computer system (e.g., system on a chip (SoC)) including one or more processors and memories, and an electronic circuit constituted by an active element such as a transistor and a passive element such as a resistor. The processor includes, for example, at least one of a central processing unit (CPU), a micro processing unit (MPU), a graphics processing unit (GPU), and a tensor processing unit (TPU). The CPU may be constituted by a plurality of CPU cores. The GPU may be constituted by a plurality of GPU cores. The memory includes a read only memory (ROM) and a random access memory (RAM). A vehicle control program may be stored in the ROM. For example, the vehicle control program may include an artificial intelligence (AI) program for automatic driving. The AI program is a program (learned model) constructed by supervised or unsupervised machine learning (in particular, deep learning) using multilayer neural networks. In the RAM, a vehicle control program, vehicle control data, and/or surrounding environment information indicating the surrounding environment of the vehicle 1 may be temporarily stored. The processor may be configured to develop the program designated from the various vehicle control programs stored in the ROM on the RAM to execute various processings in cooperation with the RAM. Further, the computer system may be constituted by a non-von Neumann computer such as an application specific integrated circuit (ASIC) or a field-programmable gate array (FPGA). Further, the computer system may be configured by combining a von Neumann computer and a non-von Neumann computer.

The sensor 5 includes at least one of an acceleration sensor, a speed sensor, and a gyro sensor. The sensor 5 is configured to detect the traveling state of the vehicle 1, and output traveling state information to the vehicle control unit 3. The sensor 5 may further include, for example, a seating sensor that detects whether a driver is sitting on a driver's seat, a face direction sensor that detects a direction of a driver's face, an outside weather sensor that detects an outside weather condition, and a person sensing sensor that detects whether a person is in the inside of the vehicle.

The camera 6 is, for example, a camera that includes a capture device such as a charge-coupled device (CCD) or a complementary metal-oxide semiconductor (CMOS). The camera 6 includes one or more external cameras 6A and internal cameras 6B.

The external camera 6A is configured to acquire image data indicating the surrounding environment of the vehicle 1, and then send the image data to the vehicle control unit 3. The vehicle control unit 3 acquires surrounding environment information based on the sent image data. Here, the surrounding environment information may include objects existing outside the vehicle 1 (pedestrians, other vehicles, or signs). For example, the surrounding environment information may include information about the properties of the objects existing outside the vehicle 1, and information about the distance and position of the objects relative to the vehicle 1. The external camera 6A may be configured as a monocular camera, or may be configured as a stereo camera.

The internal camera 6B is disposed inside the vehicle 1, and is configured to acquire image data indicating an occupant. The internal camera 6B functions, for example, as an eye tracking camera that tracks a viewpoint E of the occupant (to be described later with reference to FIG. 2). The internal camera 6B is provided, for example, in the vicinity of a room mirror, or the inside of an instrument panel.

The radar 7 includes at least one of a millimeter wave radar, a microwave radar, and a laser radar (e.g., LiDAR unit). For example, the LiDAR unit is configured to detect the surrounding environment of the vehicle 1. In particular, the LiDAR unit is configured to acquire 3D mapping data (point cloud data) indicating the surrounding environment of the vehicle 1, and then send the 3D mapping data to the vehicle control unit 3. The vehicle control unit 3 identifies surrounding environment information based on the sent 3D mapping data.

The HMI 8 is constituted by an input unit that receives an input operation from a driver, and an output unit that outputs traveling information to the driver. The input unit includes a steering wheel, an accelerator pedal, a brake pedal, and a driving mode switching switch that switches a driving mode of the vehicle 1. The output unit is a display that displays various traveling information (excluding HUD).

The GPS 9 is configured to acquire current position information of the vehicle 1, and output the acquired current position information to the vehicle control unit 3.

The wireless communication unit 10 is configured to receive information (e.g., traveling information) about other vehicles around the vehicle 1 from the other vehicles, and send information (e.g., traveling information) about the vehicle 1 to the other vehicles (vehicle-to-vehicle communication). Further, the wireless communication unit 10 is configured to receive infrastructure information from an infrastructure facility such as a signal device or a sign light, and send traveling information of the vehicle 1 to the infrastructure facility (road-to-vehicle communication). Further, the wireless communication unit 10 is configured to receive information about a pedestrian from a portable electronic device (smart phone, tablet, wearable device) carried by the pedestrian, and send own vehicle traveling information of the vehicle 1 to the portable electronic device (pedestrian-to-vehicle communication). The vehicle 1 may directly communicate with other vehicles, the infrastructure facility, or the portable electronic device in an ad-hoc mode, or may communicate with them via an access point. Further, the vehicle 1 may communicate with other vehicles, the infrastructure facility, or the portable electronic device via a communication network (not illustrated). The communication network includes at least one of the internet, a local area network (LAN), a wide area network (WAN), and a radio access network (RAN). A wireless communication standard is, for example, Wi-Fi (registered trademark), Bluetooth (registered trademark), ZigBee (registered trademark), LPWA, DSRC (registered trademark), or Li-Fi. Further, the vehicle 1 may communicate with other vehicles, the infrastructure facility, or the portable electronic device using the fifth generation mobile communication system (5G).

The storage device 11 is an external storage device such as a hard disk drive (HDD) or a solid state drive (SSD). The storage device 11 may store two-dimensional or three-dimensional map information and/or the vehicle control program. For example, the three-dimensional map information may be constituted by the 3D mapping data (point cloud data). The storage device 11 is configured to output the map information or the vehicle control program to the vehicle control unit 3 in response to a request from the vehicle control unit 3. The map information or the vehicle control program may be updated via the wireless communication unit 10 and the communication network.

When the vehicle 1 is traveling in an automatic driving mode, the vehicle control unit 3 automatically generates at least one of a steering control signal, an accelerator control signal, or a brake control signal based on the traveling state information, the surrounding environment information, the current position information, or the map information. The steering actuator 12 is configured to receive the steering control signal from the vehicle control unit 3, and to control the steering device 13 based on the received steering control signal. The brake actuator 14 is configured to receive the brake control signal from the vehicle control unit 3, and to control the brake device 15 based on the received brake control signal. The accelerator actuator 16 is configured to receive the accelerator control signal from the vehicle control unit 3, and to control the accelerator device 17 based on the received accelerator control signal. In this manner, the vehicle control unit 3 automatically controls the traveling of the vehicle 1 based on the traveling state information, the surrounding environment information, the current position information, or the map information. That is, the traveling of the vehicle 1 in the automatic driving mode is automatically controlled by the vehicle system 2.

Meanwhile, when the vehicle 1 is traveling in a manual driving mode, the vehicle control unit 3 generates the steering control signal, the accelerator control signal, and the brake control signal according to the manual operation of a driver on the accelerator pedal, the brake pedal, and the steering wheel. In this manner, in the manual driving mode, the steering control signal, the accelerator control signal, and the brake control signal are generated by the manual operation of a driver, and thus, the traveling of the vehicle 1 is controlled by the driver.

As described above, the driving mode is constituted by the automatic driving mode and the manual driving mode. The automatic driving mode is constituted by, for example, a fully automatic driving mode, an advanced driving support mode, and a driving support mode. In the fully automatic driving mode, the vehicle system 2 automatically performs all traveling control of the steering control, the brake control, and the accelerator control, and the driver is not in a state where the vehicle 1 can be driven. In the advanced driving support mode, the vehicle system 2 automatically performs all traveling control of the steering control, the brake control, and the accelerator control, and the driver is in a state where the vehicle 1 can be driven, but the driver does not drive the vehicle 1. In the driving support mode, the vehicle system 2 automatically performs a part of traveling control among the steering control, the brake control, and the accelerator control, and the driver drives the vehicle 1 under the driving support of the vehicle system 2. Meanwhile, in the manual driving mode, the vehicle system 2 does not automatically perform the traveling control, and the driver drives the vehicle 1 without the driving support of the vehicle system 2.

The HUD 20 is configured to superimpose the predetermined information (hereinafter, referred to as HUD information) on the actual space outside the vehicle 1 (particularly, surrounding environment in front of the vehicle 1), and display the HUD information as an image to the occupant of the vehicle 1. The HUD information displayed by the HUD 20 is, for example, the vehicle traveling information about the traveling of the vehicle 1 and/or the surrounding environment information about the surrounding environment of the vehicle 1 (particularly, information about the objects existing outside the vehicle 1). The HUD 20 is an AR display that functions as a visual interface between the vehicle 1 and the occupant.

The HUD 20 includes an image generation device (PGU) 24 and a control unit 25.

The image generation device 24 is configured to emit light for generating a predetermined image displayed to the occupant of the vehicle 1. For example, the image generation device 24 may emit light for generating a changing image that is changed according to the situation of the vehicle 1.

The control unit 25 controls the operation of each part of the HUD 20. The control unit 25 is connected to the vehicle control unit 3, and for example, generates a control signal to control the operation of the image generation device 24 based on the vehicle traveling information or the surrounding environment information sent from the vehicle control unit 3, and sends the generated control signal to the image generation device 24. A processor such as a CPU and a memory are mounted on the control unit 25, and the processor executes a computer program read out from the memory, and controls the operation of the image generation device 24. In the present embodiment, the vehicle control unit 3 and the control unit 25 are provided as separated components, but the vehicle control unit 3 and the control unit 25 may be integrally configured. For example, the vehicle control unit 3 and the control unit 25 may be configured by a single electronic control unit.

Figure 2:
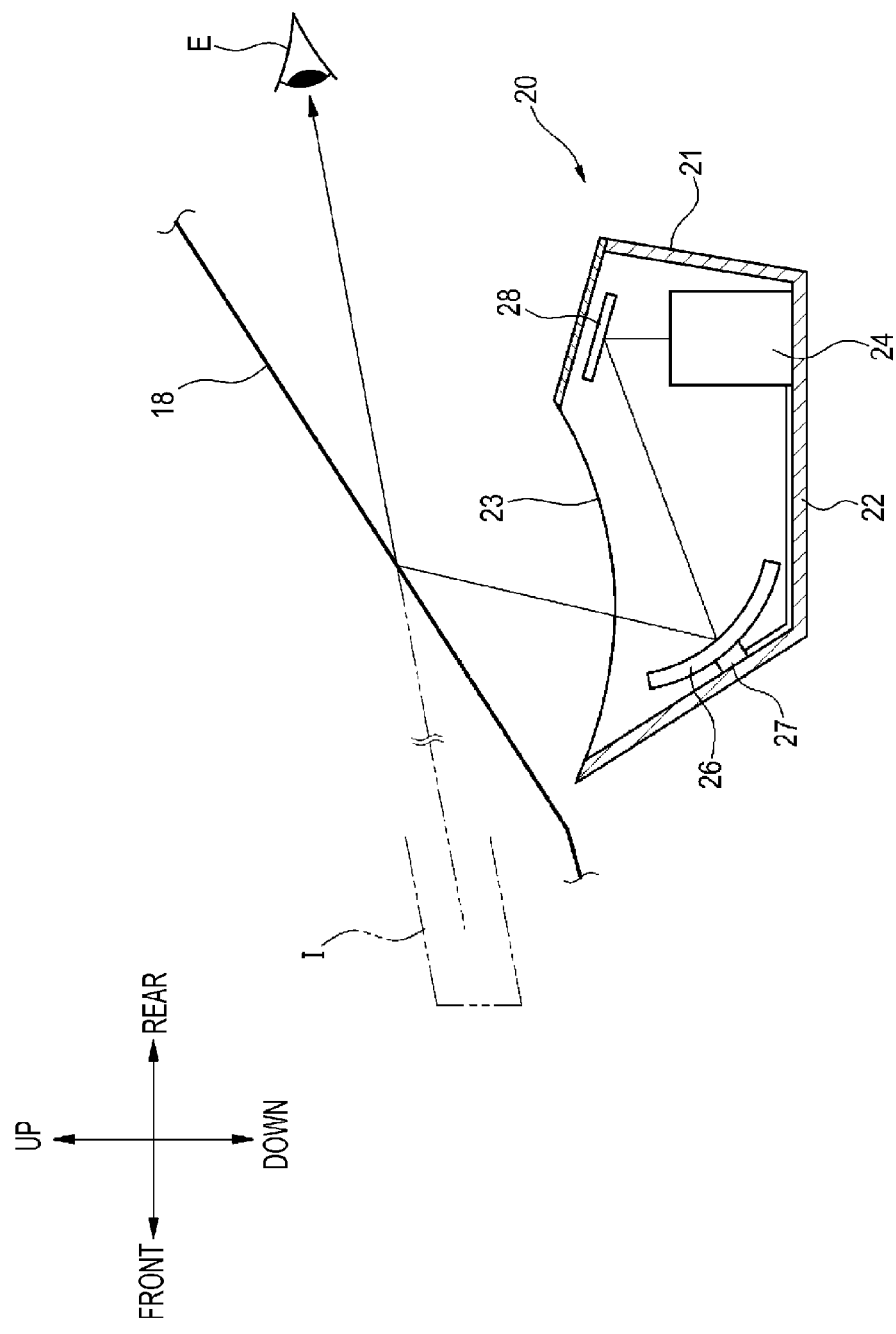
FIG. 2 is a schematic view illustrating a configuration of the HUD.

FIG. 2 is a schematic view of the HUD 20 when viewed from a side surface side of the vehicle 1. In the HUD 20, at least a part of the HUD 20 is positioned inside the vehicle 1. Specifically, the HUD 20 is installed a predetermined location inside the vehicle 1. For example, the HUD 20 may be disposed inside the dashboard of the vehicle 1.

As illustrated in FIG. 2, the HUD 20 includes a HUD body 21. The HUD body 21 includes a body housing 22 and an emitting window 23. The emitting window 23 is constituted by a transparent plate that transmits visible light. The HUD body 21 includes the image generation device 24, a concave mirror 26 (an example of the reflecting portion), and a plane mirror 28 inside the body housing 22. The control unit 25 of the HUD 20 is accommodated inside the image generation device 24 in the embodiment.

The image generation device 24 is installed inside the body housing 22 to emit light upward. The plane mirror 28 is disposed on a light path of light emitted from the image generation device 24. Specifically, the plane mirror 28 is disposed above the image generation device 24, and is configured to reflect the light emitted from the image generation device 24 toward the concave mirror 26.

The concave mirror 26 is disposed on the light path of the light emitted from the image generation device 24 and reflected by the plane mirror 28. Specifically, the concave mirror 26 is disposed on the front side of the image generation device 24 and the plane mirror 28 inside the body housing 22. The concave mirror 26 is configured to reflect the light emitted from the image generation device 24 toward a windshield 18 (e.g., front window of the vehicle 1). The concave mirror 26 has a reflective surface curved concavely to form a predetermined image, and reflects the formed image of the light emitted from the image generation device 24 at a predetermined magnification. The concave mirror 26 may include, for example, a driving mechanism 27, and may be configured to change the position and direction of the concave mirror 26 based on the control signal sent from the control unit 25.

The light emitted from the image generation device 24 is reflected by the plane mirror 28 and the concave mirror 26, and then is emitted from the emitting window 23 of the HUD body 21. The light emitted from the emitting window 23 of the HUD body 21 is irradiated to the windshield 18. A part of the light irradiated from the emitting window 23 to the windshield 18 is reflected toward the viewpoint E of the occupant. As a result, the occupant recognizes the light emitted from the HUD body 21 as a virtual image (a predetermined image) formed on the front of the windshield 18 at a predetermined distance. In this manner, the image displayed by the HUD 20 is superimposed on the actual space on the front of the vehicle 1 through the windshield 18, and as a result, the occupant may recognize a virtual image object I formed by a predetermined image as being floated on the road outside the vehicle.

Here, the viewpoint E of the occupant may be any one of the viewpoint of the left eye or the viewpoint of the right eye of the occupant. Alternatively, the viewpoint E may be defined as a midpoint of a line connecting the viewpoint of the left eye and the viewpoint of the right eye. The position of the viewpoint E of the occupant is specified, for example, based on image data acquired by the internal camera 6B. The position of the viewpoint E of the occupant may be updated at a predetermined interval, or may be determined only once when the vehicle 1 is started.

When a 2D image (planar image) is formed as the virtual image object I, a predetermined image is projected to be a virtual image at a single distance determined arbitrarily. When a 3D image (stereoscopic image) is formed as the virtual image object I, a plurality of predetermined images that are the same as or different from each other is projected to be respective virtual images at different distances. Further, the distance (distance from the viewpoint E of the occupant to the virtual image) of the virtual image object I may be appropriately adjusted by adjusting the distance from the image generation device 24 to the viewpoint E of the occupant (e.g., adjusting the distance between the image generation device 24 and the concave mirror 26).

First Embodiment

An image generation device 24A according to a first embodiment will be described with reference to FIGS. 3 to 7.

Figure 3:
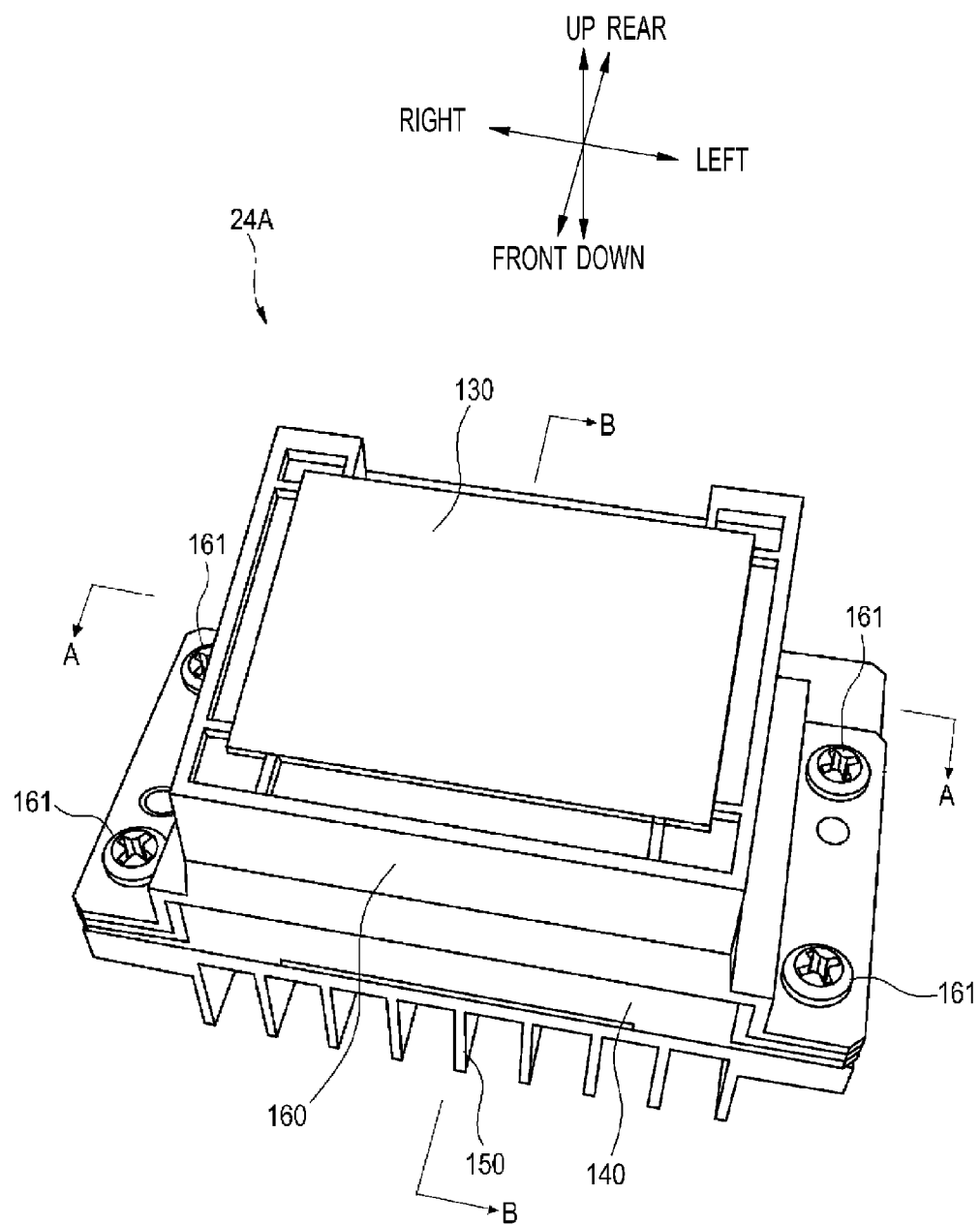
FIG. 3 is a perspective view illustrating a configuration of an image generation device according to a first embodiment.
Figure 4:
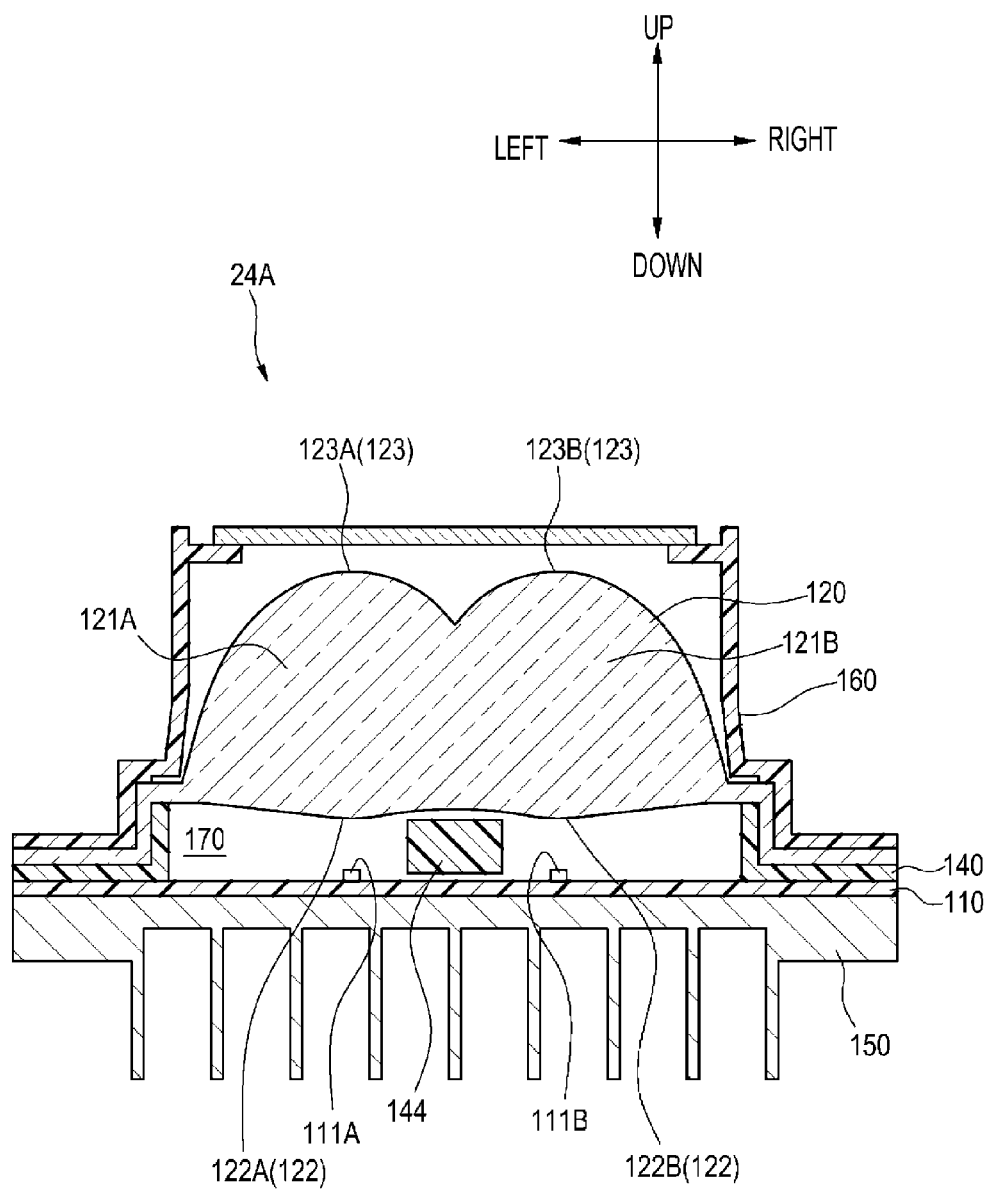
FIG. 4 is a cross-sectional view taken along line A-A in FIG. 3.

FIG. 3 is a perspective view of the image generation device 24A. FIG. 4 is a cross-sectional view taken along line A-A in FIG. 3.

As illustrated in FIGS. 3 and 4, the image generation device 24A includes a light source substrate 110 on which a light source 111 (first light source 111A and second light source 111B), a lens 120 disposed above the light source 111, and a display device 130 disposed above the lens 120. The image generation device 24A further includes a lens holder 140 disposed on the light source substrate 110, a heat sink 150 disposed below the light source substrate 110, and a PGU housing 160 that accommodates each part provided with the image generation device 24A. The light source substrate 110, the lens 120, the lens holder 140, and the heat sink 150 are, for example, fixed to the PGU housing 160 via screws 161. Further, the display device 130 is attached to the upper surface portion of the PGU housing 160.

The light source 111 (first light source 111A and second light source 111B) is, for example, a laser light source or an LED light source. The laser light source is, for example, an RGB light source configured to each emit red laser light, green laser light, and blue laser light. The first light source 111A and the second light source 111B are disposed on the light source substrate 110 to be spaced apart from each other by a certain distance in the left-right direction. The light source substrate 110 is, for example, a print substrate constituted by an insulator in which a wiring of an electric circuit is printed on the surface or the inside of the plate.

The lens 120 is, for example, an aspherical lens having an incident surface 122 on which light from the light source 111 is incident and an emitting surface 123 from which the incident light is emitted, both of which are formed as convex surfaces. The lens 120 is configured to transmit or reflect the light emitted from the light source 111 to be emitted toward the display device 130.

The lens 120 of the first embodiment includes a first region 121A that transmits first light emitted from the first light source 111A, and a second region 121B that transmits second light emitted from the second light source 111B. The first light source 111A and the second light source 111B are disposed in parallel in the left-right direction. The first region 121A is an aspherical convex lens corresponding to the first light source 111A. The second region 121B is an aspherical convex lens corresponding to the second light source 111B. An incident surface 122A of the first region 121A and an incident surface 122B of the second region 121B are incident surfaces having a convex shape that slightly bulges downward. An emitting surface 123A of the first region 121A and an emitting surface 123B of the second region 121B are emitting surfaces having a convex shape that bulges upward. A part of the right side of the first region 121A disposed on the left side and a part of the left side of the second region 121B disposed on the right side are coupled to each other. The lens 120 is attached to the lens holder 140 such that the center of the emitting surface of the first light source 111A becomes a focal point position of the first region 121A and the center of the emitting surface of the second light source 111B becomes a focal point position of the second region 121B.

The display device 130 is a liquid crystal display or a digital mirror device (DMD). The display device 130 forms light for generating a predetermined image by the light of the light source 111 that transmits the lens 120. The display device 130 is attached to the upper surface portion of the PGU housing 160 in a state where the light emitting surface configured to emit light that generates the image is directed upward of the image generation device 24A. The display device 130 is, for example, attached to the PGU housing 160 from the upper surface side of the PGU housing 160. A drawing method of the image generation device 24A may be a raster scan method, a DLP method, or an LCOS method. When the DLP method or the LCOS method is adopted, the light source 111 of the image generation device 24A may be an LED light source. When a liquid crystal display method is adopted, the light source 111 of the image generation device 24A may also be a white LED light source.

The lens holder 140 holds the lens 120 inside the PGU housing 160 such that the light emitted from the light source 111 is correctly incident with respect to the incident surface 122 of the lens 120. The detailed configuration of the lens holder 140 will be described later with reference to FIG. 5.

The heat sink 150 is made of aluminum or copper, which has a high thermal conductivity. The heat sink 150 is provided to be in contact with the back surface of the light source substrate 110 in order to dissipate heat generated from the light source substrate 110.

Figure 5:
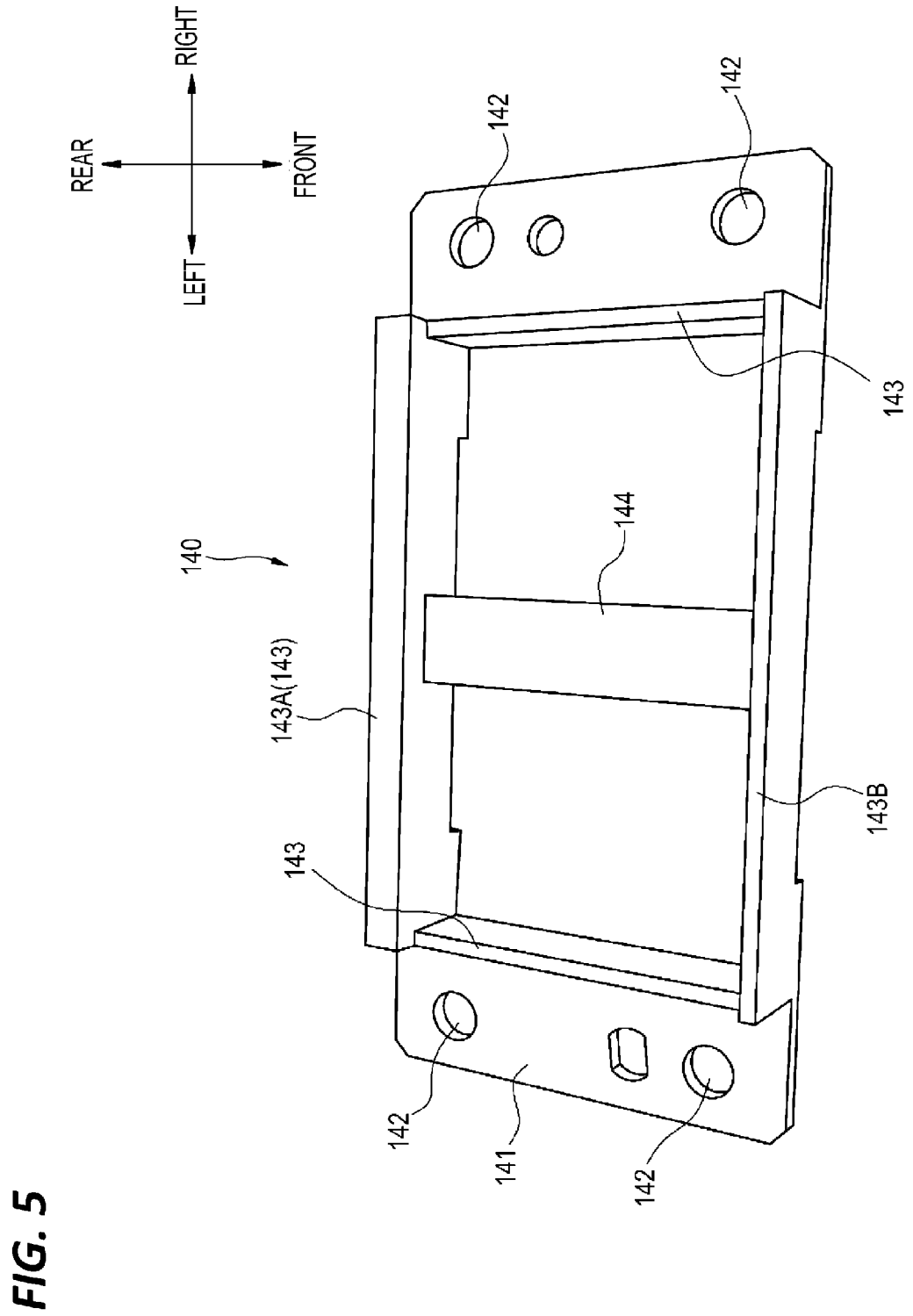
FIG. 5 is a perspective view illustrating a lens holder of the image generation device in FIG. 3.

FIG. 5 is a perspective view of the lens holder 140 viewed from the lens 120 side. As illustrated in FIG. 5, the lens holder 140 includes a pair of attaching portions 141 having attaching holes 142 for the screws 161, and a frame portion 143 provided between the pair of attaching portions 141. The frame portion 143 is provided with a light shielding portion 144 that is able to shield the light emitted from the light source 111. The light shielding portion 144 is provided in a central portion of the lens holder 140 in the left-right direction to connect a front side frame portion 143A and a rear side frame portion 143B of the lens holder along the front-rear direction. The light shielding portion 144 is formed integrally with the lens holder 140.

The light shielding portion 144 has a rectangular shape in a cross-sectional view (see FIG. 4). The light shielding portion 144 is provided to be disposed between the first light source 111A and the second light source 111B in a space 170 formed between the first light source 111A and the second light source 111B, and the lens 120. The light shielding portion 144 is able to shield the first light emitted from the first light source 111A to transmit the second region 121B of the lens 120, and is able to shield the second light emitted from the second light source 111B to transmit the first region 121A of the lens 120. The surface of the light shielding portion 144 may be, for example, painted black so that the light irradiated from each of the light sources 111A and 111B may be absorbed without being reflected.

Figure 6:
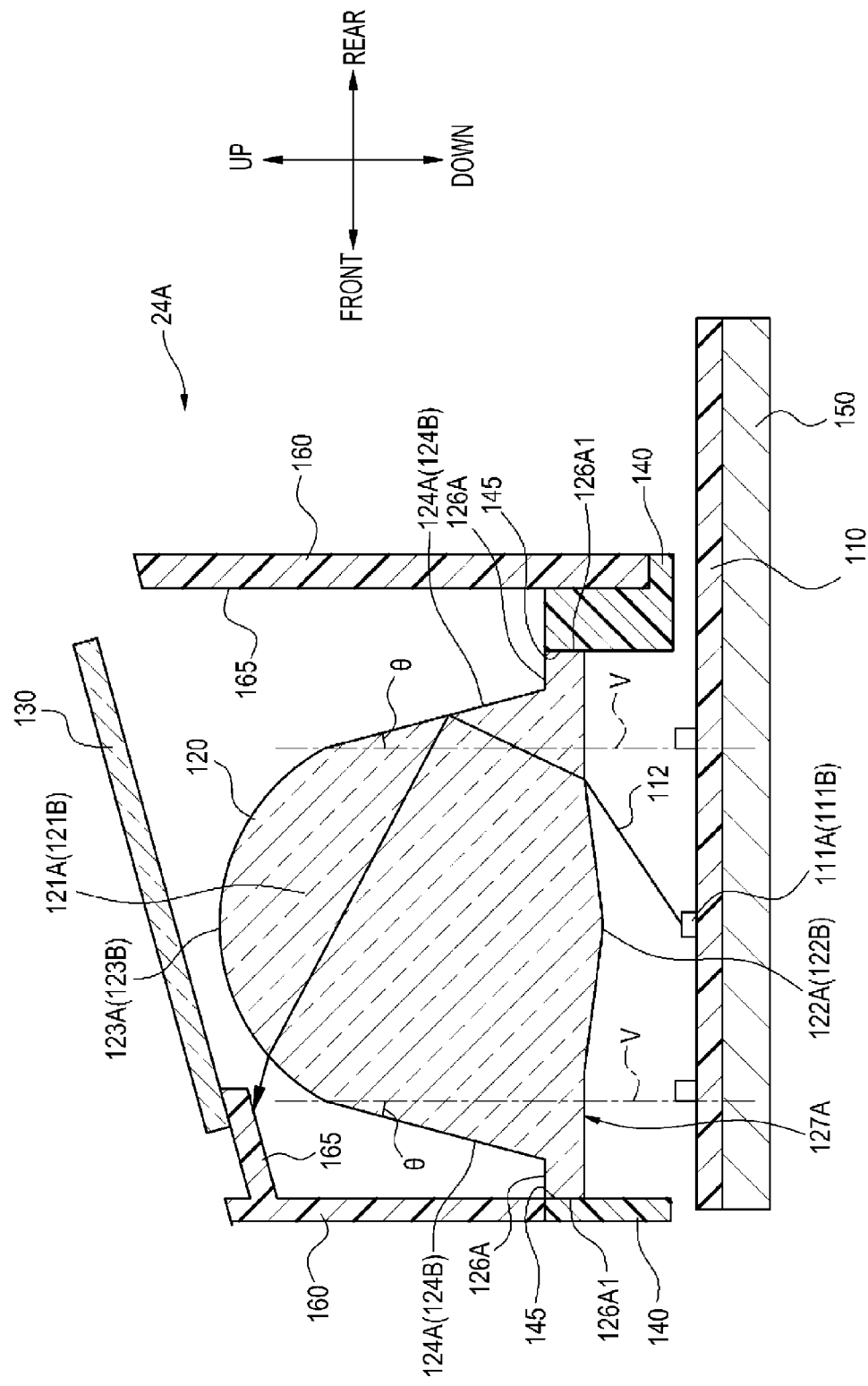
FIG. 6 is a cross-sectional view taken along line B-B in FIG. 3.

FIG. 6 is a cross-sectional view taken along line B-B in FIG. 3. FIG. 6 illustrates a cross-sectional view of the first region 121A of the lens 120 along the front-rear direction and the upward-downward direction. The cross-sectional view of the second region 121B of the lens 120 has the same configuration as the cross-sectional view of the first region 121A illustrated in FIG. 6, and thus, detailed description or illustration thereof will be omitted.

As illustrated in FIG. 6, the first region 121A of the lens 120 includes an incident portion 127A constituted by the incident surface 122A, and a flange portion 126A provided to be continuous with the incident surface 122A on the outer periphery of the incident surface 122A. An outer side surface 126A1 of the flange portion 126A is in contact with an inner side surface 145 of the lens holder 140.

The first region 121A further includes an upright wall surface 124A that connects the incident portion 127A and the emitting surface 123A. In the example of the lens 120 of the first embodiment, the upright wall surface 124A is formed at each of the upper outer periphery and the lower outer periphery of the lens 120. The upright wall surface 124A is formed so as to spread outward from the center of the lens 120 as it goes from the emitting surface 123A toward the incident portion 127A. In other words, the upright wall surface 124A is formed to be inclined with respect to a direction V perpendicular to the surface of the light source substrate 110 on which the first light source 111A is mounted (a direction along the center line of the lens). An inclination angle θ of the upright wall surface 124A is set to be 5 degree or more, or may be 15 degree or more. When the inclination angle θ is less than 5 degree, it is difficult to remove the lens 120 from the mold when the lens 120 is molded.

In at least a part of the surrounding of the display device 130, a light shielding portion 165 that shields light emitted from the first light source 111A and internally reflected by the upright wall surface 124A is provided. In the first embodiment, a part of the PGU housing 160 that holds the display device 130 functions as the light shielding portion 165. The PGU housing 160 is made of, for example, a black resin so as to be able to shield the light emitted from the first light source 111A. For example, as illustrated by a light path 112, the light emitted from the first light source 111A is incident to the inside of the lens 120 from the incident surface 122A of the lens 120, and then, is reflected by the upright wall surface 124A. The light reflected by the upright wall surface 124A is emitted from the emitting surface 123A, and then, is irradiated toward the light shielding portion 165 of the PGU housing 160 without being incident on the display device 130.

Figure 7:
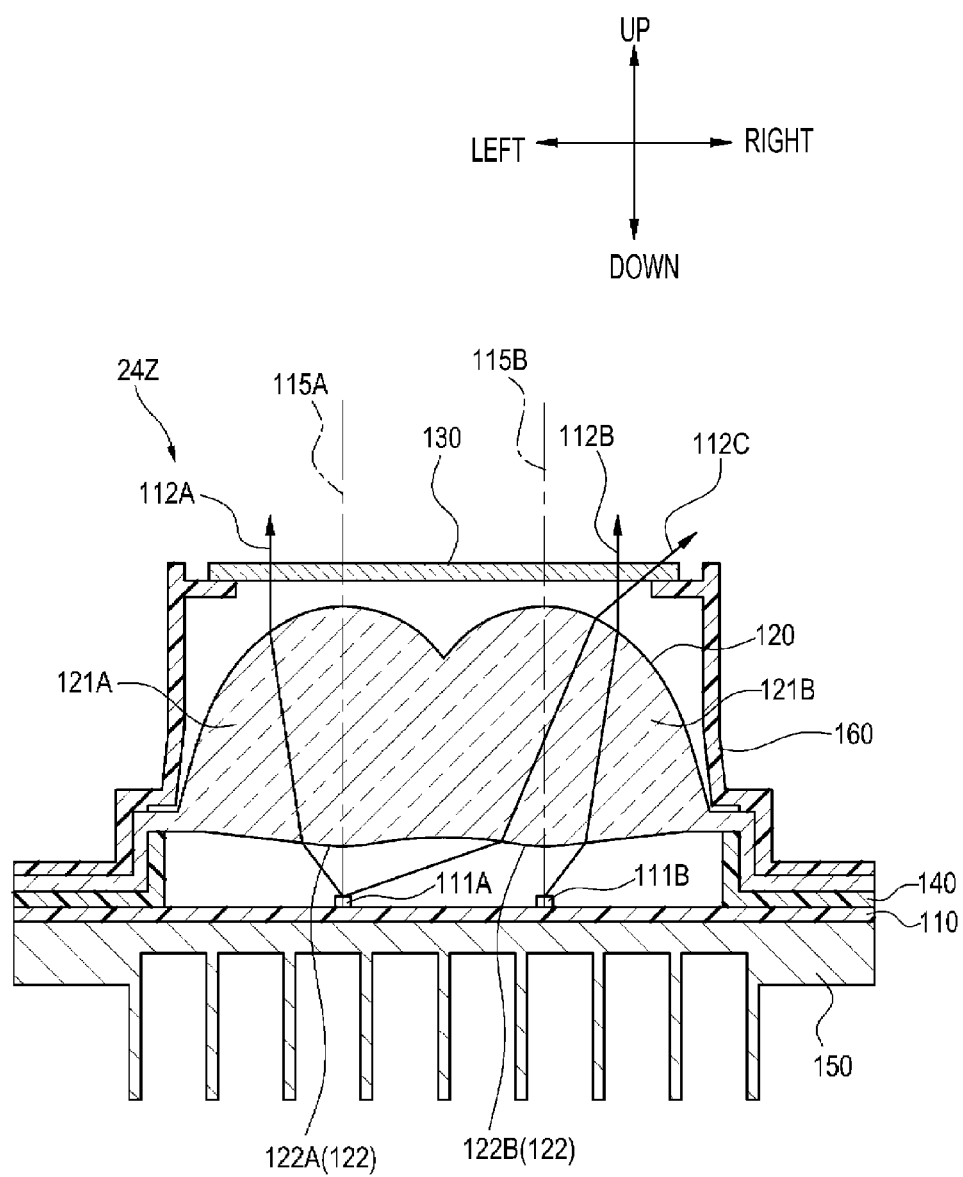
FIG. 7 is a cross-sectional view of an image generation device in a state where a light shielding portion is not provided.

FIG. 7 is a view illustrating a light path of the light emitted from the first light source 111A and the second light source 111B in an image generation device 24Z including the lens holder 140 that is not provided with the light shielding portion 144.

The light emitted from the first light source 111A and the second light source 111B is incident on the incident surfaces 122A and 122B of the lens 120. Since the lens 120 has a shape in which two aspherical convex lenses are coupled in parallel as the same as the image generation device 24A described above, for example, as illustrated by a first light path 112A, most of the light emitted from the first light source 111A is incident on the first region 121A of the lens 120 and is incident on the display device 130 as light parallel to an optical axis 115A. In the same manner, for example, as illustrated by a second light path 112B, most of the light emitted from the second light source 111B is incident on the second region 121B, and is incident on the display device 130 as light parallel to an optical axis 115B.

However, since the light shielding portion 144 is not provided in the image generation device 24Z, for example, as illustrated by a third light path 112C, a part of the light emitted from the first light source 111A is incident on the second region 121B from the incident surface 122B. As illustrated by the third light path 112C, the light incident on the incident surface 122B from the first light source 111A proceeds in a direction different from the direction of the optical axis 115A and is incident on the display device 130. Although the illustration is omitted, in the same manner, light of the light emitted from the second light source 111B, which is incident on the incident surface 122A of the first region 121A proceeds in a direction different from the direction of the optical axis 115B and is incident on the display device 130. In this manner, the light incident on the incident surface 122B of the second region 121B from the first light source 111A, or incident on the incident surface 122A of the first region 121A from the second light source 111B is incident on the display device 130 as light that is not parallel to the optical axes 115A and 115B, which may cause glare to the driver of the vehicle 1.

With regard to this, the image generation device 24A according to the first embodiment includes the first light source 111A, the second light source 111B disposed to be spaced apart from the first light source 111A at a certain distance, the lens 120 that transmits the light emitted from the first light source 111A and the second light source 111B, the display device 130 that forms the light for generating the image by the light that transmits the lens 120, and the lens holder 140 that holds the lens 120. Then, the lens 120 is constituted by the first region 121A that transmits light emitted from the first light source 111A (an example of the first light), and the second region 121B that is coupled in parallel to the first region 121A and transmits light emitted from the second light source 111B (an example of the second light). The lens holder 140 is provided with the light shielding portion 144 that is disposed between the first light source 111A and the second light source 111B in the space 170 between the first light source 111A and the second light source 111B, and the lens 120, shields the light emitted from the first light source 111A to transmit the second region 121B, and shields the light emitted from the second light source 111B to transmit the first region 121A. With this configuration, the glare may be suppressed, which may occur by the light from the first light source 111A that is incident from the incident surface 122B of the lens 120 and transmits the second region 121B, or by the light from the second light source 111B that is Incident from the incident surface 122A of the lens 120 and transmits the first region 121A. Further, since the light shielding portion 144 is provided in the lens holder 140, the number of parts may be reduced as compared with the case where the light shielding portion 144 is provided separately from the lens holder 140. As a result, the image generation device 24A may be manufactured at a low cost.

Further, according to the image generation device 24A, the first region 121A and the second region 121B of the lens 120 are aspherical lenses having the incident surfaces 122A and 122B and the emitting surfaces 123A and 123B both formed as a convex surface. As a result, the light emitted from the first light source 111A and the light emitted from the second light source 111B may be aberration-corrected by the lens 120 and incident on the display device 130 as parallel light. As a result, the generation precision of the virtual image object I may be improved.

Further, in the image generation device 24A, the lens 120 includes the incident portion 127A having the incident surface 122A on which the light from the light source 111A is incident and the flange portion 126A provided to be continuous with the incident surface 122A, the emitting surface 123A from which the light is emitted, and the upright wall surface 124A that is the portion connecting the incident portion 127A and the emitting surface 123A and having the shape that spreads outward from the center of the lens 120 as it goes from the emitting surface 123A toward the incident portion 127A. In at least a part of the surrounding of the display device 130, the light shielding portion 165 that shields light internally reflected by the upright wall surface 124A is provided. For example, as indicated by the broken line in FIG. 6, when the upright wall surface 124A is not provided in the lens 120, the light emitted from the light source 111A and internally reflected by the portion indicated by the broken line of the lens 120 may become stray light and be incident on the display device 130. With regard to this, as in the embodiment, in the case where the upright wall surface 124A that is inclined outward from the emitting surface 123A toward the incident portion 127A is provided in the lens 120, the light emitted from the light source 111A and internally reflected by the upright wall surface 124A is irradiated to the light shielding portion 165, and is shielded by light shielding portion 165. As a result, the light internally reflected by the upright wall surface 124A is not incident on the display device 130. As a result, it is possible to suppress the glare caused by the fact that the light reflected by the upright wall surface 124A becomes stray light and is incident on the display device 130.

Further, the upright wall surface 124A is raised from a part of the outer periphery of the incident portion 127A. That is, the upright wall surface 124A is provided on the outer periphery of the lens 120 in the front-rear direction, but as illustrated in FIG. 4, the upright wall surface 124A is not provided on the outer periphery of the lens in the left-right direction. As a result, it is possible to suppress the occurrence of glare while maintaining the size of the effective surface of the lens 120.

Further, by making the inclination angle θ of the upright wall surface 124A 5 degree or more, it is possible to suppress the occurrence of glare while securing the draft taper of the mold for molding the lens. Further, by making the inclination angle θ of the upright wall surface 124A 15 degree or more, it is possible to more reliably suppress the occurrence of glare.

Further, by the image generation device 24A, at least a part of the PGU housing 160 is configured to function as the light shielding portion 165. As a result, it is possible to provide the light shielding portion 165 having a simple configuration, and to suppress the occurrence of glare.

Second Embodiment

Figure 8:
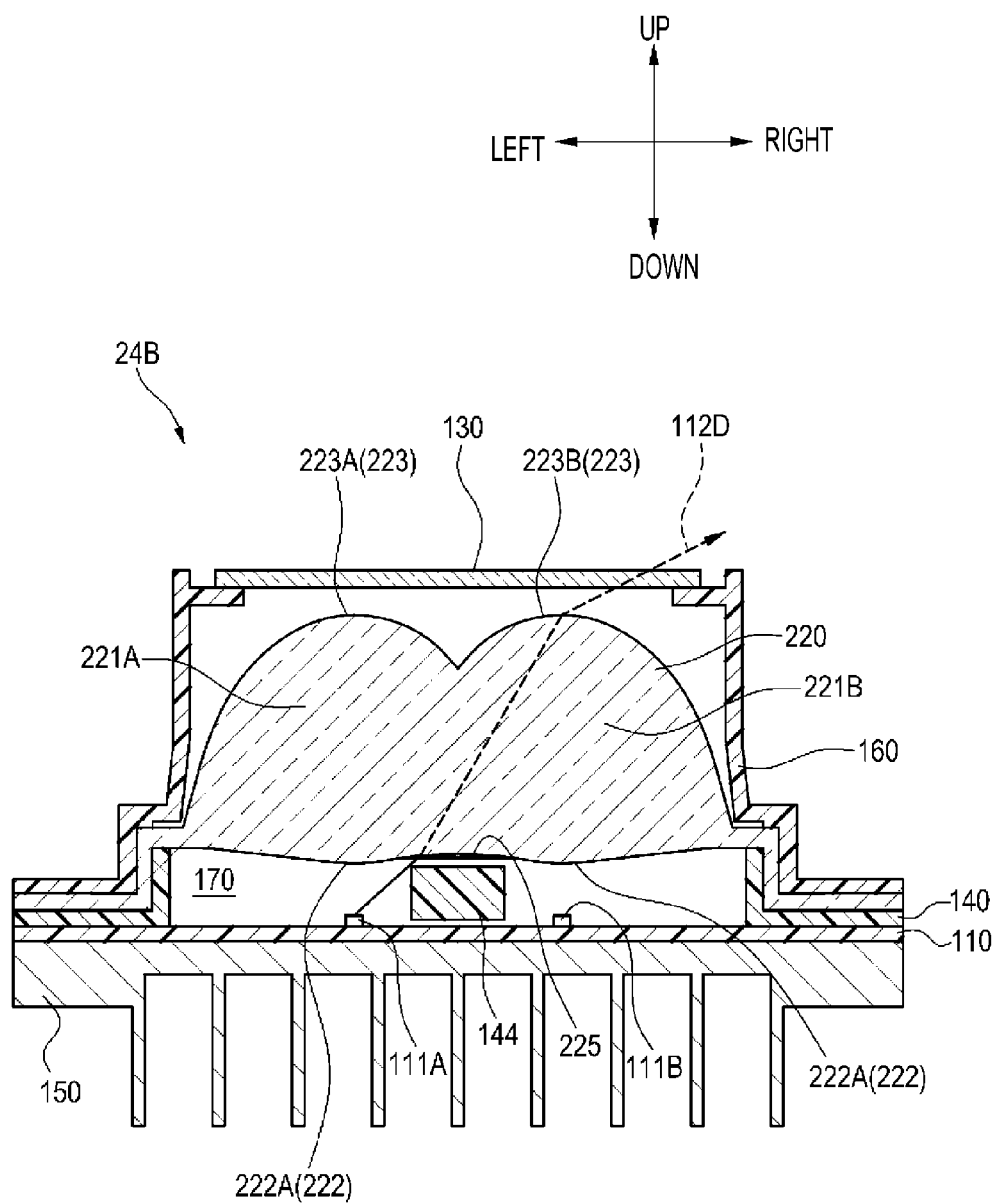
FIG. 8 is a cross-sectional view illustrating a configuration of an image generation device according to a second embodiment.
Figure 9:
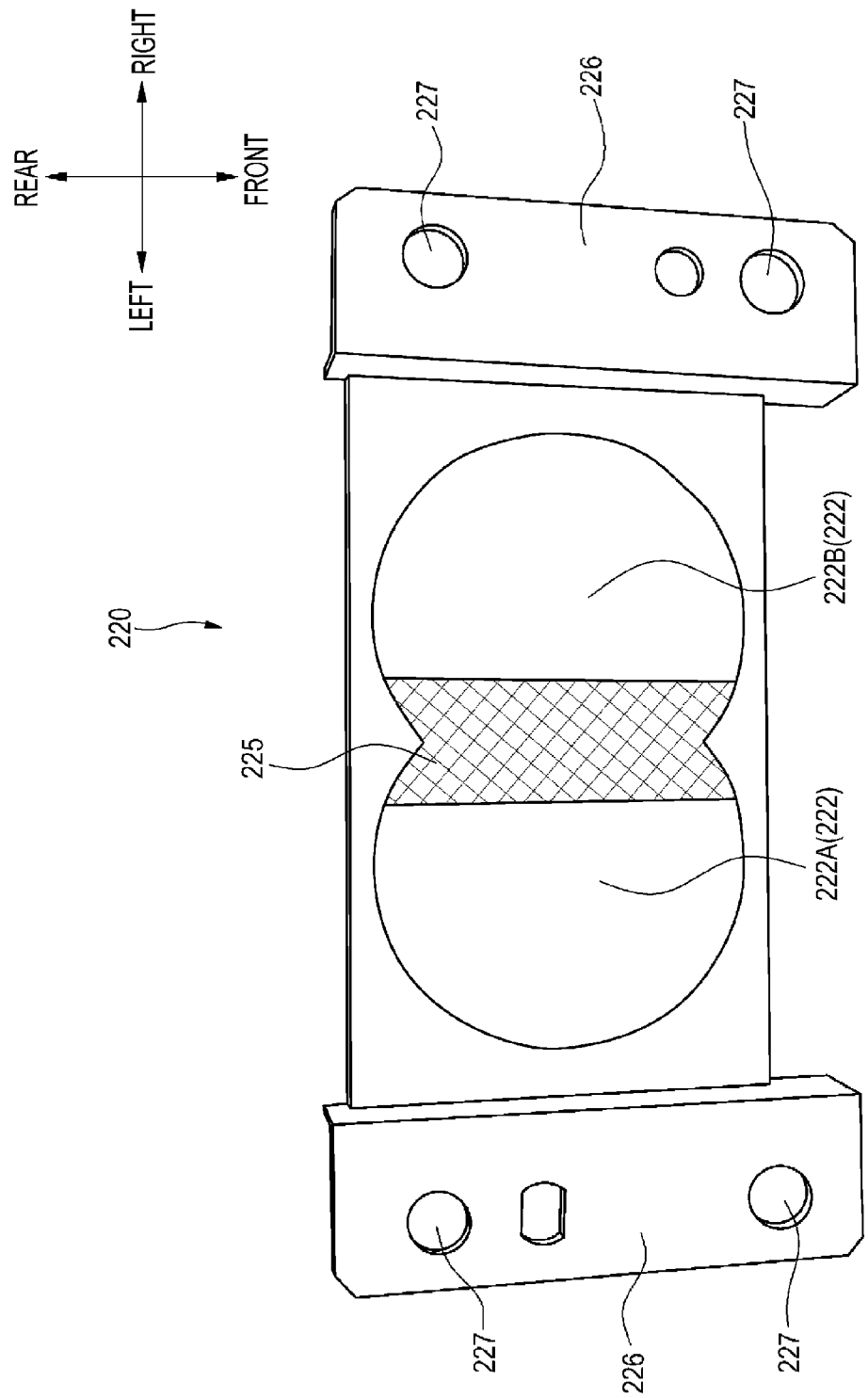
FIG. 9 is a perspective view illustrating a lens of the image generation device illustrated in FIG. 8.

Next, an image generation device 24B according to a second embodiment will be described with reference to FIGS. 8 and 9. The members denoted by the same reference numerals as those the image generation device 24A according to the first embodiment have the same configuration as that of the image generation device 24A, and thus, the description thereof will be omitted. FIG. 8 is a cross-sectional view of the image generation device 24B. FIG. 9 is a perspective view of a lens 220 provided with the image generation device 24B viewed from the light sources 111A and 111B sides.

As illustrated in FIGS. 8 and 9, an incident surface 222 of the lens 220 of the image generation device 24B is provided with a light shielding portion 225 that is able to shield the light emitted from the light sources 111A and 111B. An attaching portion 226 including attaching holes 227 for the screws 161 is provided on both left and right sides of the lens 220.

The light shielding portion 225 is formed by performing an emboss processing on the incident surface 222. The light shielding portion 225, which is an emboss-processed surface, is provided in a strip shape in a central portion of the lens 220 in the left-right direction, that is, a predetermined region between an incident surface 222A of a first region 221A and an incident surface 222B of a second region 221B. The light shielding portion 225 is provided to be spanned a part of the incident surface 222A and a part of the incident surface 222B. The light shielding portion 225 faces the upper surface of the light shielding portion 144 provided in the lens holder 140. For example, the light shielding portion 225 is provided to be slightly wider in both left and right directions than the width of the light shielding portion 144 in the left-right direction. The light shielding portion 225 is able to shield the light emitted from the first light source 111A to transmit the second region 221B, and is able to shield the light emitted from the second light source 111B to transmit the first region 221A.

In this manner, the image generation device 24B according to the second embodiment further includes the light shielding portion 225 of the lens 220 in addition to the light shielding portion 144 of the lens holder 140. With this configuration, light that cannot be shielded by the light shielding portion 144, for example, light such as a fourth light path 112D illustrated in FIG. 8 may be shielded by the light shielding portion 225 of the lens 220. As a result, it is possible to more reliably shield the light from the first light source 111A to be incident on the second region 221B from the incident surface 222B, or the light from the second light source 111B to be incident on the first region 221A from the incident surface 222A, and to further suppress the occurrence of glare.

In the image generation device 24B of the second embodiment, the light shielding portion 144 of the lens holder 140 and the light shielding portion 225 of the lens 220 are provided as the light shielding portions, but the present disclosure is not limited thereto. For example, the light shielding portion 225 of the lens 220 may be provided without providing the light shielding portion 144 of the lens holder 140.

Third Embodiment

Figure 10:
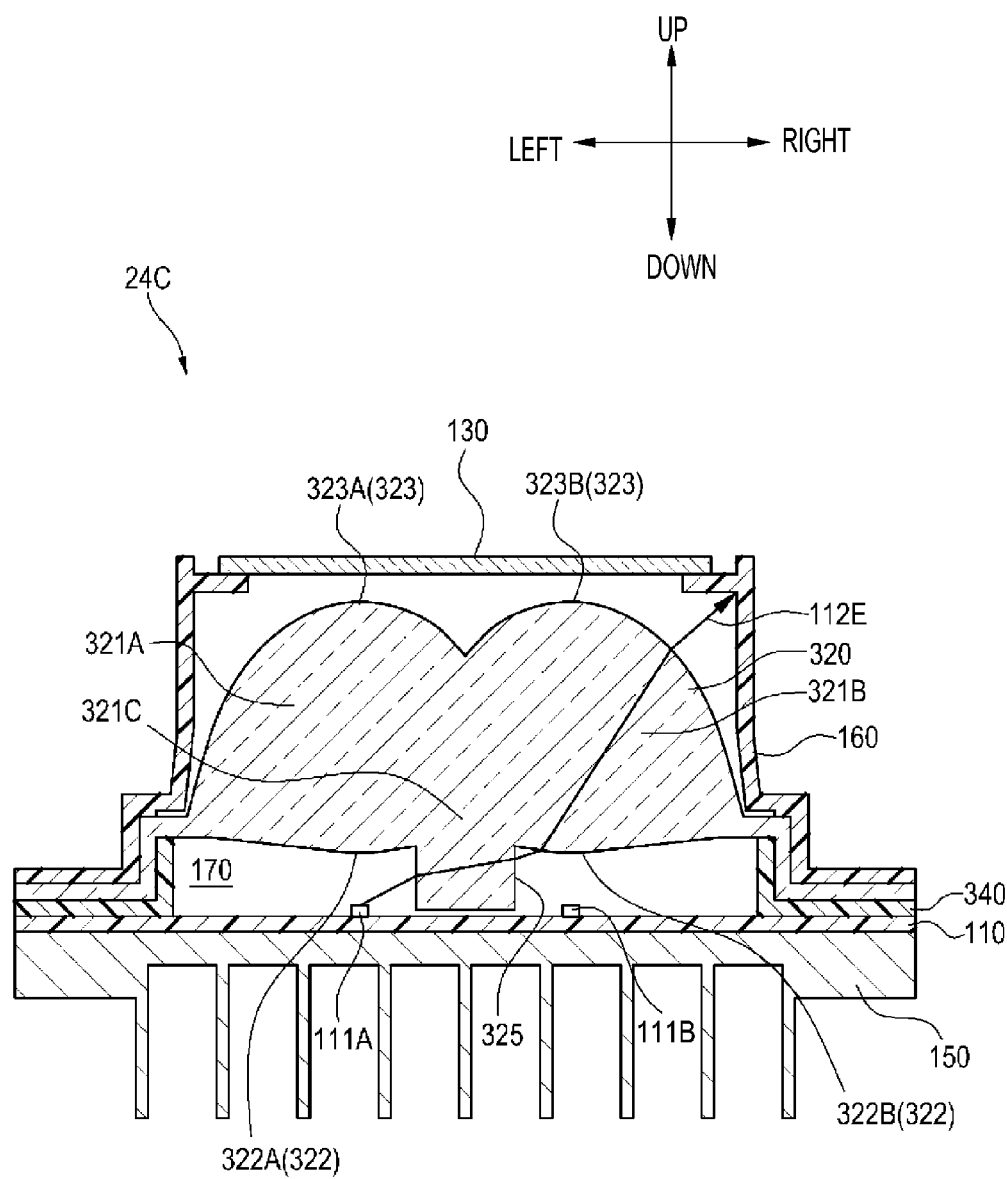
FIG. 10 is a cross-sectional view illustrating a configuration of an image generation device according to a third embodiment.
Figure 11:
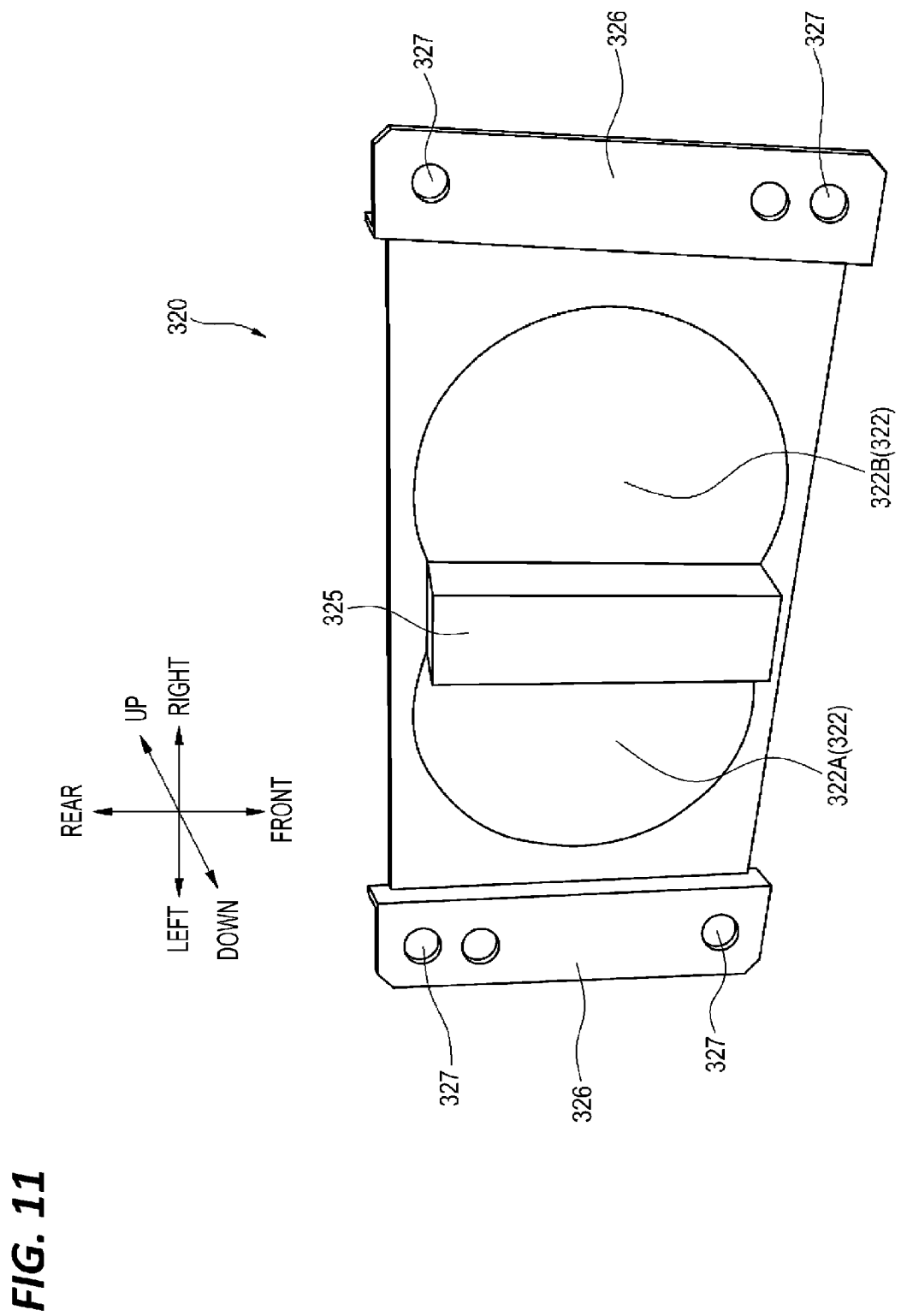
FIG. 11 is a perspective view illustrating a lens of the image generation device illustrated in FIG. 10.

Next, an image generation device 24C according to a third embodiment will be described with reference to FIGS. 10 and 11. The members denoted by the same reference numerals as those the image generation device 24A according to the first embodiment have the same configuration as that of the image generation device 24A, and thus, the description thereof will be omitted. FIG. 10 is a cross-sectional view of the image generation device 24C. FIG. 11 is a perspective view of a lens 320 viewed from the light sources 111A and 111B sides.

In the image generation device 24C, the shape of the lens 320 disposed on the light source substrate 110 is different from the lens 120 of the image generation device 24A according to the first embodiment. Further, a lens holder 340 of the image generation device 24C is different from the lens 140 of the image generation device 24A according to the first embodiment in that it does not include a light shielding portion.

As illustrated in FIGS. 10 and 11, an incident surface 322 of the lens 320 is provided with a light shielding portion 325 that is able to refract light emitted from the light sources 111A and 111B and incident on the lens 320. An attaching portion 326 including attaching holes 327 for the screws 161 is provided on both left and right sides of the lens 320.

The light shielding portion 325 is provided in a central portion of the lens 320 in the left-right direction. The light shielding portion 325 is provided in a third region 321C formed between a first region 321A and a second region 321B. The light shielding portion 325 is provided as a protrusion that protrudes below an incident surface 322A of the first region 321A and an incident surface 322B of the second region 321B, from the third region 321C toward the first light source 111A side and the second light source 111B side. The light shielding portion 325 is formed integrally with the lens 320 as a part of the lens 320.

The light shielding portion 325 has, for example, a rectangular shape in the cross-sectional view of FIG. 10. The light shielding portion 325 extends along the front-rear direction of the lens 320. The light shielding portion 325 is provided to be disposed between the first light source 111A and the second light source 111B in the space 170 formed between the first light source 111A, the second light source 111B, and the lens 320. The light shielding portion 325 transmits the light emitted from the first light source 111A and transmits the light emitted from the second light source 111B.

In this manner, the image generation device 24C according to the third embodiment includes the light shielding portion 325 serving as a protrusion that protrudes from the third region 321C formed between the first region 321A and the second region 321B toward the first light source 111A side and the second light source 111B side, in the incident surface 322 of the lens 320. With this configuration, since the light shielding portion 325 is provided as the protrusion that protrudes from the lens 320, it is possible to refract light emitted from the first light source 111A and proceeding toward the second region 321B by the light shielding portion 325 so as not to be incident on the display device 130, for example, like a fifth light path 112E illustrated in FIG. 10. Although the illustration is omitted, in the same manner, it is possible to refract light emitted from the second light source 111B and proceeding toward the first region 321A by the light shielding portion 325 so as not to be incident on the display device 130. As a result, it is possible to suppress the glare that may be generated by the fact that the light from the first light source 111A transmits the second region 321B, or the light from the second light source 111B transmits the first region 321A. Further, since the light shielding portion 325 is integrally provided with the lens 320, the number of parts may be reduced as compared with the case where the light shielding portion 325 is provided separately from the lens 320. As a result, the image generation device 24C may be manufactured at a low cost.

Fourth Embodiment

Figure 12:
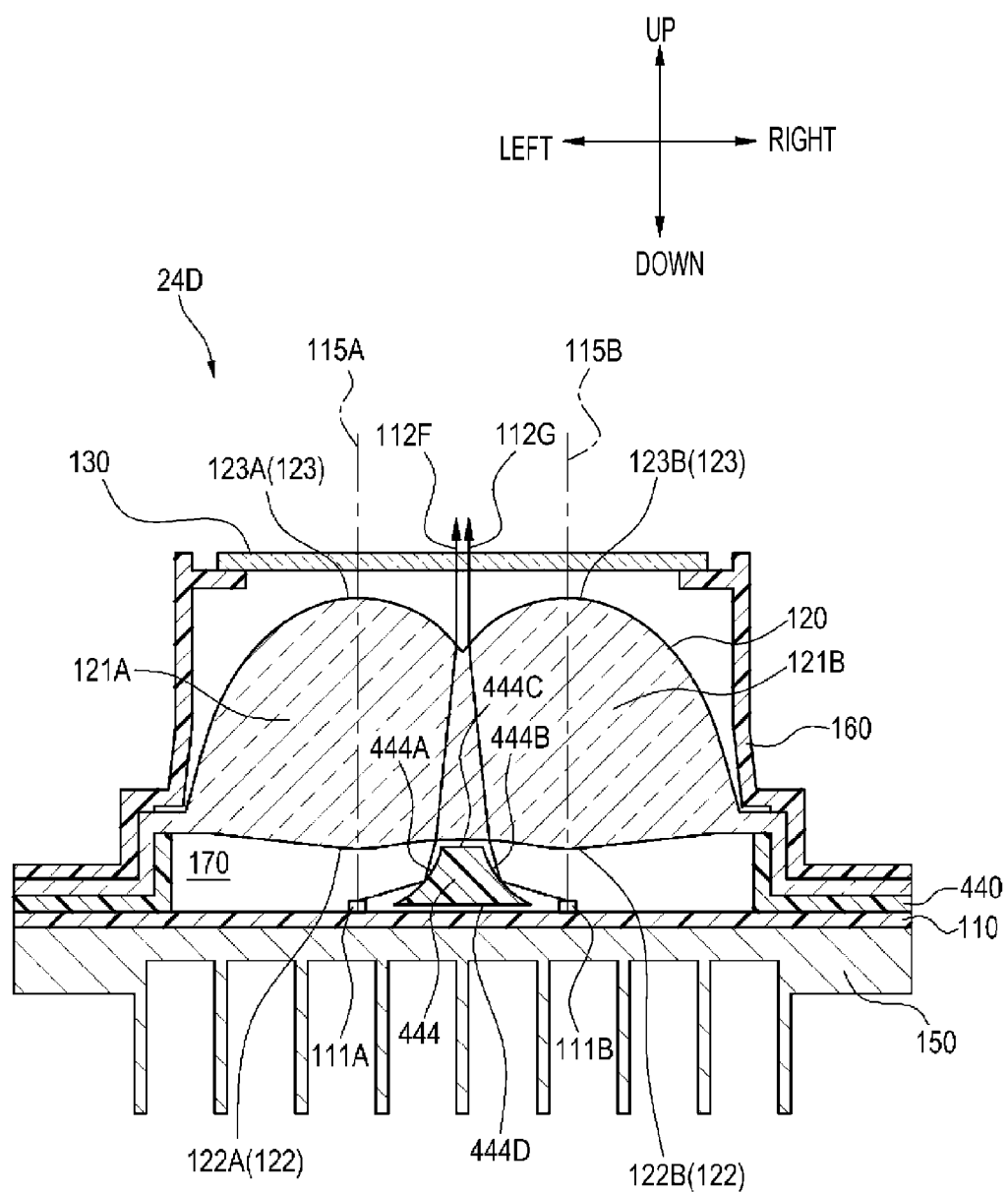
FIG. 12 is a cross-sectional view illustrating a configuration of an image generation device according to a fourth embodiment.
Figure 13:
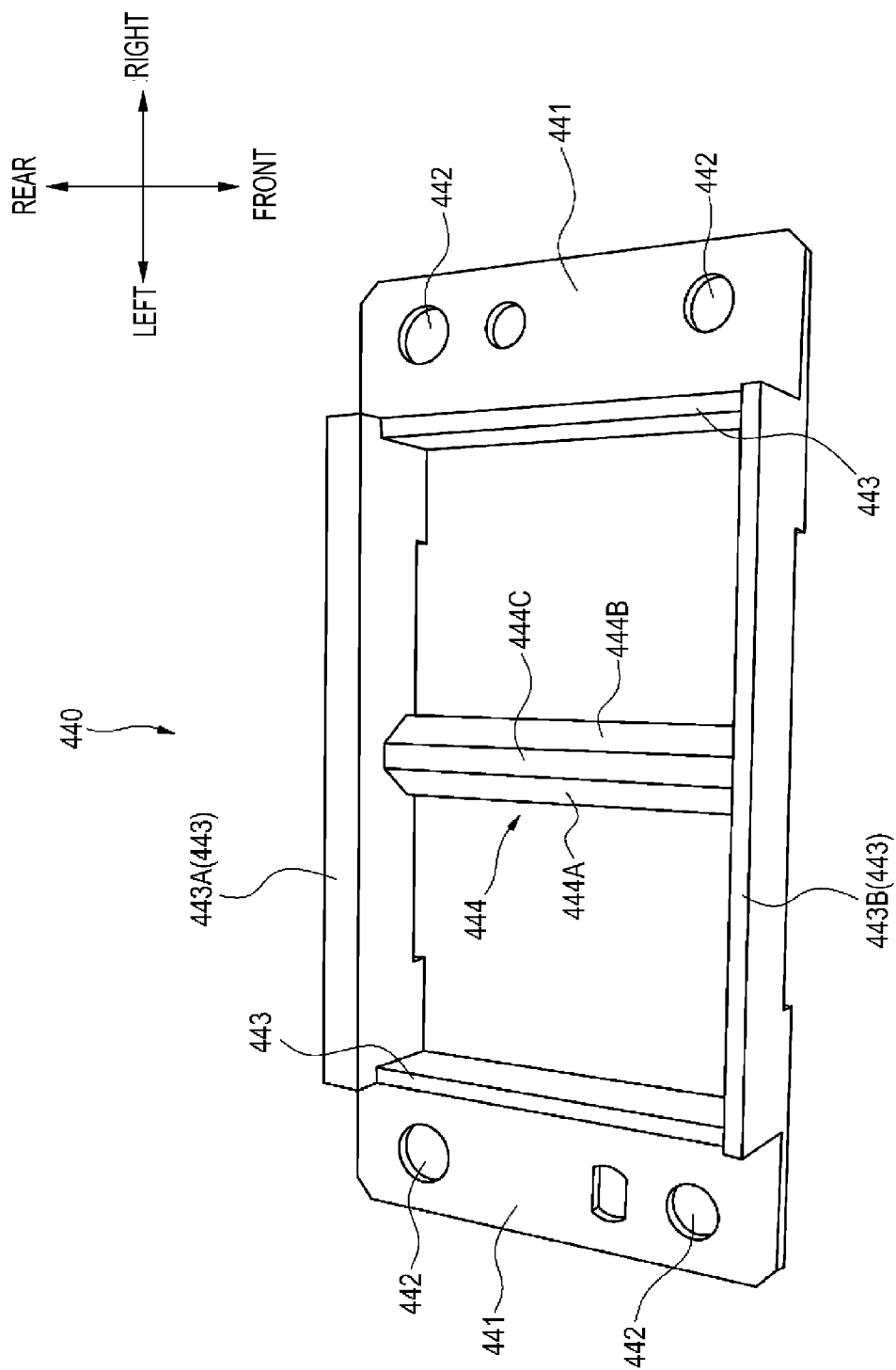
FIG. 13 is a perspective view illustrating a lens holder of the image generation device illustrated in FIG. 12.

Next, an image generation device 24D according to a fourth embodiment will be described with reference to FIGS. 12 and 13. The members denoted by the same reference numerals as those the image generation device 24A according to the first embodiment have the same configuration as that of the image generation device 24A, and thus, the description thereof will be omitted. FIG. 12 is a cross-sectional view of the image generation device 24D. FIG. 13 is a perspective view of the lens holder 440 provided in the image generation device 24D viewed from the lens 120 side.

In the image generation device 24D, the configuration of the lens 440 disposed on the light source substrate 110 is different from the lens holder 140 of the image generation device 24A according to the first embodiment.

As illustrated in FIG. 13, the lens holder 440 includes a pair of attaching portions 441 having attaching holes 442 for the screws 161, and a frame portion 443 provided between the pair of attaching portions 441. The frame 443 is provided with a reflecting portion 444 (an example of a light shielding portion). The reflecting portion 444 is provided in the central portion of the lens holder 440 in the left-right direction to connect a front side frame 443A and a rear side frame 443B of the lens holder 440 along the front-rear direction. The reflecting portion 444 is formed integrally with the lens holder 440.

As illustrated in FIG. 12, the reflecting portion 444 has a shape that spreads at the end portion to be widened in the left-right direction as it goes downward viewed in a cross-sectional view. That is, the width of a lower surface 444D of the reflecting portion 444 is larger than the width of an upper surface 444C of the reflecting portion 444. The side surfaces of the reflecting portion 444 in the left and right directions constitute a first reflective surface 444A and a second reflective surface 444B that is able to reflect the light emitted from the first light source 111A and the second light source 111B. The first reflective surface 444A and the second reflective surface 444B are formed as reflective surfaces curved concavely. For example, metal such as aluminum is deposited on the first reflective surface 444A and the second reflective surface 444B. The reflecting portion 444 is provided to be disposed between the first light source 111A and the second light source 111B in the space 170 formed between the first light source 111A and the second light source 111B, and the lens 120. The first reflective surface 444A reflects the light emitted from the first light source 111A and directed to the second region 121B toward the first region 121A. The second reflective surface 444B reflects the light emitted from the second light source 111B and directed to the first region 121A toward the second region 121B.

In this manner, according to the image generation device 24D according to the fourth embodiment, the lens holder 440 includes the reflecting portion 444 having the first reflective surface 444A and the second reflective surface 444B curved concavely. The first reflective surface 444A is disposed in the space 170 formed between the first light source 111A and the second light source 111B, and the lens 120 at a position where the light directed from the first light source 111A toward the second region 121B is reflected toward the first region 121A. The second reflective surface 444B is disposed in the space 170 at a position where the light directed from the second light source 111B toward the first region 121A is reflected toward the second region 121B, As a result, for example, as a sixth light path 112F illustrated in FIG. 12, the light emitted from the first light source 111A and proceeding toward the second region 121B may be reflected by the first reflective surface 444A, and may be incident on the display device 130 as light substantially parallel to the optical axis 115A. In the same manner, for example, as illustrated by a seventh light path 112G, the light emitted from the second light source 111B and proceeding toward the first region 121A may be reflected by the second reflective surface 444B, and may be incident on the display device 130 as light substantially parallel to the optical axis 115B. As a result, it is possible to suppress the occurrence of glare without deteriorating the effective utilization rate of the light emitted from the first light source 111A and the second light source 111B.

Although the embodiments of the present disclosure have been described above, it goes without saying that the technical scope of the present disclosure should not be construed as being limited by the description of the embodiments. It will be appreciated by those skilled in the art that the embodiments are merely examples and various modifications can be made on the embodiments within the scope of the present disclosure described in the claims. The technical scope of the present disclosure should be determined based on the scope of the disclosure described in the claims and the equivalent scope thereof.

In the embodiments, it is configured that the light emitted from the image generation device 24 is reflected by the concave mirror 26 and irradiated to the windshield 18, but the present disclosure is not limited thereto. For example, the light reflected by the concave mirror 26 may be irradiated to the combiner (not illustrated) provided inside the windshield 18. The combiner is, for example, constituted by a transparent plastic disc. A part of the light irradiated to the combiner from the image generation device 24 of the HUD body 21 is reflected toward the viewpoint E of the occupant as in the case where the light is irradiated to the windshield 18.

Further, in the embodiment, the driving mode of the vehicle has been described as including the fully automatic driving mode, the advanced driving support mode, the driving support mode, and the manual driving mode, but the driving mode of the vehicle is not necessarily limited to those four modes. The driving mode of the vehicle may include at least one of the four modes. For example, the driving mode of the vehicle may be executable any one of the driving modes.

Further, the classification of the driving mode of the vehicle or the display form may be appropriately changed in accordance with the laws or regulations related to the automatic driving in each country. Similarly, the definitions of each of "fully automatic driving mode," "advanced driving support mode," and "driving support mode" described in the description of the embodiment are merely examples, and these definitions may be appropriately changed in accordance with the laws or regulations related to the automatic driving in each country.

The above descriptions on the specific embodiments of the present disclosure are presented for purposes of illustration. The descriptions are not intended to be exhaustive or to limit the present disclosure to the precise form as described. It will be apparent to those skilled in the art that various modifications and variations are possible in light of the above descriptions.

DESCRIPTION OF SYMBOLS

1: vehicle
2: vehicle system
3: vehicle control unit
18: windshield
20: head-up display (HUD)
21: HUD body
22: body housing
23: emitting window
24 (24A to 24D): image generation device
25: control unit
26: concave mirror (example of reflecting portion)
110: light source substrate
111: light source
111A: first light source
111B: second light source
120, 220, 320: lens
121A: first region
121B: second region
122A, 122B: incident surface
123A, 123B: emitting surface
124A, 124B: upright wall surface
130: display device
140, 340, 440: lens holder
143, 443: frame
143A, 443A: front frame
143B, 443B: rear frame
144, 165, 225, 325: light shielding portion
150: heat sink
160: PGU housing
170: space
321A: first region
321B: second region
321C: third region
444: reflecting portion (light shielding portion)
444A: first reflective surface
444B: second reflective surface

What is claimed is:

1. An image generation apparatus for generating an image for a head-up display, the image generation apparatus comprising:
a first light source;
a second light source disposed to be spaced apart from the first light source by a predetermined distance;
a lens configured to transmit light emitted from the first light source and the second light source;
a holder configured to hold the lens; and
a display device configured to form light that generates the image from the light transmitted through the lens,
wherein the lens is constituted by a first region that transmits first light from the first light source, and a second region that transmits second light from the second light source, and
a light shield is further provided on the holder between the first light source and the second light source in a space formed between the first and second light sources and the lens, and connects a front side frame portion and a rear side frame portion of the holder along a front-rear direction of the holder to prevent the first light from transmitting through the second region and prevent the second light from transmitting through the first region.

2. The image generation apparatus according to claim 1, wherein the light shield further includes an emboss-processed surface provided between the first region and the second region on an incident surface of the lens.

3. An image generation apparatus for generating an image for a head-up display, the image generation apparatus comprising:
a first light source;
a second light source disposed to be spaced apart from the first light source by a predetermined distance;
a lens configured to transmit light emitted from the first light source and the second light source; and
a display device configured to form light that generates the image from the light transmitted through the lens,
wherein the lens is constituted by a first region that transmits first light from the first light source, and a second region that transmits second light from the second light source,
a light shield is further provided to prevent the first light from transmitting through the second region and prevent the second light from transmitting through the first region, and
the light shield is a protrusion that protrudes toward a region between the first light source and the second light source from a third region formed between the first region and the second region on the incident surface of the lens.

4. The image generation apparatus according to claim 1, wherein the light shield further includes a first reflective surface and a second reflective surface,
the first reflective surface is disposed at a position where light directed from the first light source toward the second region is reflected toward the first region in the space formed between the first and second light sources and the lens, and
the second reflective surface is disposed at a position where light directed from the second light source toward the first region is reflected toward the second region in the space.

5. The image generation apparatus according to claim 1, wherein each of the first region and the second region is an aspherical lens having the incident surface and an emitting surface both formed as convex surfaces.

6. A head-up display comprising:
   the image generation apparatus according to claim 1, and
   at least one reflector configured to reflect light emitted from the image generation apparatus such that the light is irradiated to a windshield or a combiner.

7. The image generation apparatus according to claim 1, wherein the light shield is formed integrally with the holder.

8. The image generation apparatus according to claim 1, wherein a surface of the light shield is painted black.

* * * * *